United States Patent
Saurat et al.

(10) Patent No.: US 12,510,010 B2
(45) Date of Patent: Dec. 30, 2025

(54) EXHAUST GAS TREATMENT DEVICE AND VEHICLE

(71) Applicant: Faurecia Emissions Control Technologies, Germany GmbH, Augsburg (DE)

(72) Inventors: David Saurat, Augsburg (DE); Christophe Basso, Augsburg (DE); Bastien Decrouy, Augsburg (DE); Sébastien Petitjean, Augsburg (DE)

(73) Assignee: Faurecia Emissions Control Technologies, Germany GmbH, Augsburg (DE)

( * ) Notice: Subject to any disclaimer, the term of this patent is extended or adjusted under 35 U.S.C. 154(b) by 660 days.

(21) Appl. No.: 17/604,020

(22) PCT Filed: Apr. 9, 2020

(86) PCT No.: PCT/EP2020/060282
§ 371 (c)(1),
(2) Date: Oct. 15, 2021

(87) PCT Pub. No.: WO2020/212273
PCT Pub. Date: Oct. 22, 2020

(65) Prior Publication Data
US 2022/0195904 A1   Jun. 23, 2022

(30) Foreign Application Priority Data
Apr. 18, 2019  (DE) .................. 10 2019 110 359.2

(51) Int. Cl.
*F01N 3/20* (2006.01)

(52) U.S. Cl.
CPC ........ *F01N 3/2013* (2013.01); *F01N 2240/16* (2013.01)

(58) Field of Classification Search
CPC .... F01N 3/2013; F01N 2240/16; F01N 3/027; F01N 13/00
See application file for complete search history.

(56) References Cited

U.S. PATENT DOCUMENTS

| 2,091,905 | A | * | 8/1937 | Bensel | H05B 3/50 |
| | | | | | 219/544 |
| 3,770,389 | A | * | 11/1973 | Kitzner | F01N 13/017 |
| | | | | | 422/174 |

(Continued)

FOREIGN PATENT DOCUMENTS

| DE | 4131970 A1 | 4/1992 |
| DE | 19640577 A1 | 4/1997 |

(Continued)

OTHER PUBLICATIONS

International Preliminary Report on Patentability for PCT/EP2020/060282 dated Oct. 28, 2021.

*Primary Examiner* — Matthew T Largi
(74) *Attorney, Agent, or Firm* — Carlson, Gaskey & Olds, P.C.

(57) ABSTRACT

An exhaust gas treatment device for a motor vehicle has a housing, which defines an exhaust gas duct through which the exhaust gas flows, and an electric heating device which extends through the exhaust gas duct and through which exhaust gas flows. The electric heating device has a heating component attached to a carrier structure, the heating component being attached to the carrier structure, and first and second electrodes which are attached to the heating device and make electrical contact with the heating device. The first electrode extends as far as into a central region of the heating device, and the second electrode extends as far as into an edge region of the heating device, as viewed in the exhaust gas flow direction in the exhaust gas duct.

15 Claims, 3 Drawing Sheets

(56) References Cited

U.S. PATENT DOCUMENTS

| | | | |
|---|---|---|---|
| 4,548,625 A | 10/1985 | Ishida et al. | |
| 5,070,694 A * | 12/1991 | Whittenberger | F01N 3/2026 422/174 |
| 5,101,095 A * | 3/1992 | Wagner | H05B 3/76 123/549 |
| 5,140,812 A * | 8/1992 | Cornelison | F01N 3/2026 422/174 |
| 5,177,961 A * | 1/1993 | Whittenberger | F01N 3/2892 422/174 |
| 5,215,722 A | 6/1993 | Nishizawa | |
| 5,494,642 A * | 2/1996 | Sanada | F01N 3/2026 422/174 |
| 5,519,191 A * | 5/1996 | Ketcham | F01N 3/2026 422/174 |
| 5,526,462 A * | 6/1996 | Kondo | F01N 3/2814 219/536 |
| 5,536,478 A * | 7/1996 | Lipp | H05B 3/08 422/174 |
| 5,672,324 A * | 9/1997 | Okamoto | B01J 35/33 422/174 |
| 5,744,104 A * | 4/1998 | Sakurai | F01N 3/2026 422/174 |
| 5,851,495 A | 12/1998 | Yoshizaki et al. | |
| 5,887,427 A * | 3/1999 | Maus | F01N 3/2026 422/174 |
| 5,888,456 A * | 3/1999 | Hashimoto | F01N 3/2892 422/177 |
| 7,931,715 B2 | 4/2011 | Gonze et al. | |
| 10,801,388 B2 * | 10/2020 | Culbertson | H05B 1/0236 |
| 11,174,771 B2 * | 11/2021 | Sommier | F01N 3/2026 |
| 2010/0095657 A1 * | 4/2010 | Gonze | F01N 3/035 219/201 |
| 2010/0319331 A1 * | 12/2010 | Wagner | F01N 13/0097 55/282.3 |
| 2014/0041367 A1 * | 2/2014 | Balthes | F02B 29/0418 60/274 |
| 2014/0060014 A1 * | 3/2014 | Gonze | F01N 3/106 60/286 |
| 2017/0226909 A1 | 8/2017 | Hirth et al. | |
| 2018/0142599 A1 * | 5/2018 | Pannuzzo | B01D 46/0027 |

FOREIGN PATENT DOCUMENTS

| | | |
|---|---|---|
| DE | 102005011657 A1 | 9/2006 |
| DE | 102013217009 A1 | 3/2014 |
| DE | 102018107825 A1 | 10/2018 |

* cited by examiner

EXHAUST GAS TREATMENT DEVICE AND VEHICLE

CROSS-REFERENCE TO RELATED APPLICATIONS

This application is the US national phase of PCT/EP2020/060282, which was filed on Apr. 9, 2020, which claims priority to DE 10 2019 110 359.2, filed Apr. 18, 2019.

FIELD OF THE DISCLOSURE

The disclosure relates to an exhaust gas treatment device for a motor vehicle, including a housing, which defines an exhaust gas duct through which the exhaust gas flows, and a separate electric heating device, which extends through the exhaust gas duct and through which exhaust gas flows. The electric heating device is configured to heat the exhaust gas separately from an exhaust gas purification device that is separate from the heating device The electric heating device includes a heating component and a carrier structure, the heating component being attached to the carrier structure, and first and second electrodes, which are attached to the heating device and make electrical contact with the heating device. The disclosure further relates to a vehicle including an exhaust gas treatment device.

BACKGROUND

In order to limit the emission of pollutants from internal combustion engines of motor vehicles, it is known to employ exhaust gas purification devices, such as, for example, catalytic converters, particulate filters or the like, for exhaust gas purification.

To ensure catalytically assisted conversion of the pollutants, the exhaust gas or the exhaust gas purification device needs to have a specified minimum temperature. In particular after a cold start or restart of the internal combustion engine, such a minimum temperature is often not yet reached.

According to one variant, in exhaust gas treatment devices the exhaust gas purification devices themselves are electrically heated in order to reach or maintain the specified minimum temperature. The present disclosure does not relate to these exhaust gas treatment devices.

As an alternative—and this relates to the present disclosure—separate heating devices are used which are associated with the exhaust gas purification device but are connected upstream of it in terms of flow. In these separate heating devices, electrodes provide the power supply, and additionally provided fasteners serve for fastening.

SUMMARY

The subject disclosure provides a simple, reliable, and separate heating device for an exhaust gas treatment device.

According to the disclosure, a first electrode extends as far as into a central region of a heating device, and a second electrode extends as far as into an edge region of the heating device, as viewed in the exhaust gas flow direction in the exhaust gas duct. Since the first electrode extends as far as the central region of the heating device and the heating component is fastened to the first electrode, deformation of the heating device can be reduced or avoided. Moreover, owing to the current being centrally conducted in or out, the heating device can be heated up uniformly across the flow cross-section.

Due to the fact that the heating device is a separate component that is independent in relation to the exhaust gas purification device and only serves to heat the exhaust gas and does not perform any purification function and is therefore connected upstream of the exhaust gas purifying body, the exhaust gas treatment device may be of a modular design. This simplifies assembly or disassembly. In addition, a more efficient heating of the exhaust gas can be ensured, since no material of the associated exhaust gas purification device is also heated. Furthermore, the heating device may be positioned upstream of the exhaust gas purification device so as to be spatially separated as desired, since it is not integrated in the latter.

In particular, the two electrodes constitute mechanical fasteners, by which the heating device is fastened to the housing. The two electrodes assume the power supply and additionally provide for the fastening of the heating device. In other words, the electrodes are part of the carrier structure. The housing constitutes a shared housing for an exhaust gas purification device and for the heating device.

Optionally, the heating device and the exhaust gas purification device may each have a separate housing.

In particular, the heating device is arranged upstream of the exhaust gas purification device in the exhaust gas flow direction.

Preferably, the edge region is a circumferentially closed frame region the radial extension of which is defined by the radial extent of at least one of the second electrode and the carrier structure, and/or the edge region circumferentially encloses the central region. Depending on how far the second electrode extends radially into the heating device toward the central region, the radial width of the edge region is larger or smaller. This has a direct influence on the extension of the central region.

In particular, the current flow between the two electrodes takes place in the radial direction, in particular from the central region to the edge region, or vice versa. Accordingly, there is (essentially) no current flow in the axial direction, viewed in or against the exhaust gas flow direction.

One embodiment provides that on the heating device side, the two electrodes are coupled only to the heating component and, on the housing side, are coupled to at least one of the housing and a fastening sleeve attached to an outside of the housing. The electrodes necessarily have to be coupled to the heating component in order to be able to contact it electrically. Since they are only coupled to the heating component on the heating device side and do not come into contact in this area with any other part that is not intended to be electrically contacted, there is no need to produce a connection point that is elaborately insulated. The attachment on the housing side allows easy access to the electrodes. In addition, the housing-side attachment is easy to put to practice.

In a further embodiment, the carrier structure has at least one support frame surrounding the heating device on the outside, in particular in the edge region. The support frame is used to circumferentially stabilize the heating component.

In this embodiment, the support frame may feature a recess in the region of a connection point between the second electrode and the heating component, in particular in the edge region.

Optionally, the support frame may be circumferentially closed.

In particular, the support frame may comprise an electrically conductive material or an electrically insulating material and may form part of the second electrode.

An electrically conductive support frame has the advantage that the heating component can be contacted over a larger area. This increases the reliability of the contacting and improves the current flow in the heating component.

One aspect provides that the support frame is attached to the housing with at least one fastener so as to be insulated from the housing and/or is attached to the housing so as to be insulated with at least one second electrode. The stability of the support frame and thus of the heating device can be increased by at least one fastener. If a plurality of second electrodes are used for fastening, the reliability of the contacting can additionally be increased and the current flow in the heating component be improved.

A further aspect provides that at least one of the first electrode, the second electrode, and the fastener extends through the housing toward the heating device and each is received in a fastening sleeve attached to the housing. The fastening sleeve serves to protect the through opening as well as the electrodes and/or the fastener from dirt, wetness, or the like. In addition, the fastening sleeve ensures the tightness of the exhaust gas treatment device.

Preferably, at least one of the first electrode, the second electrode, and the fastener is insulated in the region of the housing and/or the fastening sleeve, in particular by a glass and/or ceramic insulation.

In a further embodiment, the carrier structure is electrically conductive, thereby forming part of at least one of the first and second electrodes. In this way, the area in which the heating component is supplied with current is significantly increased, as a result of which the reliability of the contacting can be increased and the current flow in the heating component can be improved.

According to a further aspect, the heating component is an inherently stiff heating grid that is contacted by the first electrode in the central region and is coupled to the second electrode in the edge region. A heating grid of this type is easy to manufacture, since it can be electrolytically worked from or punched out of a metal sheet, for example. Depending on the size of the openings, the exhaust gas flow resistance caused by the heating device as well as the heating intensity can be influenced. Also, such a heating grid can be easily installed in the heating device or the exhaust gas treatment device.

In particular, the heating grid, preferably in the edge region, is mounted on its outside to the support frame. This allows the stability of the heating grid to be increased.

The support frame may comprise electrically conductive material and be contacted by the electrodes. In this way, the support frame can form part of the electrodes, which increases the contacting area available to the heating component. This allows the reliability of the contacting to be increased and the current flow in the heating component to be improved.

A further aspect provides that a gap exists between the heating device and the housing, the gap optionally being filled by an insulating material. The gap serves to reduce or prevent interactions between the heating device and the housing and to compensate for manufacturing inaccuracies. Use of an insulating material allows interaction to be reliably eliminated.

Furthermore, the subject disclosure comprises a vehicle having an internal combustion engine and an exhaust gas treatment device.

The advantages and characteristics as described of the exhaust gas treatment device according to the disclosure apply equally to the vehicle, and vice versa.

BRIEF DESCRIPTION OF THE DRAWINGS

Further advantages and characteristics of the disclosure will be apparent from the following description and the drawings, to which reference is made and in which.

DETAILED DESCRIPTION

Figure 1:
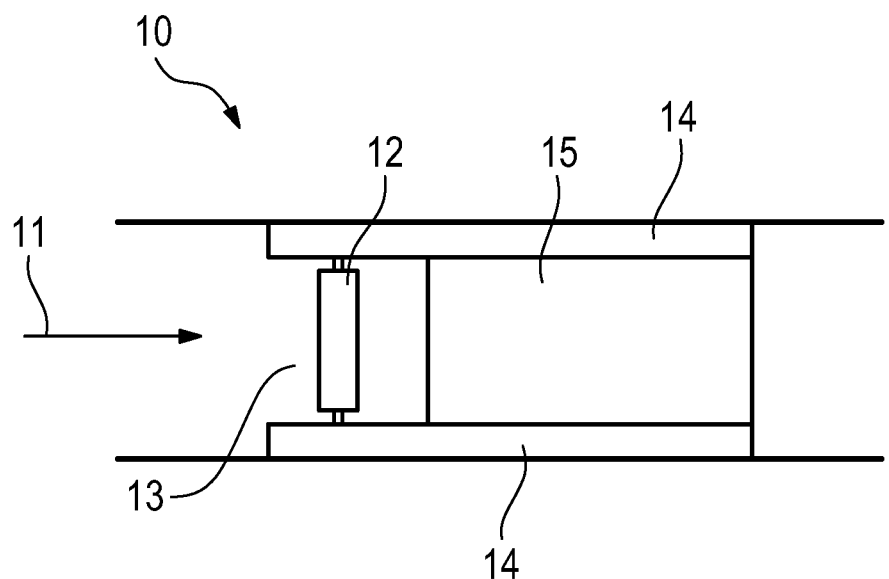
FIG. 1 shows a schematic longitudinal section taken through an exhaust gas treatment device according to the disclosure.
Figure 2:
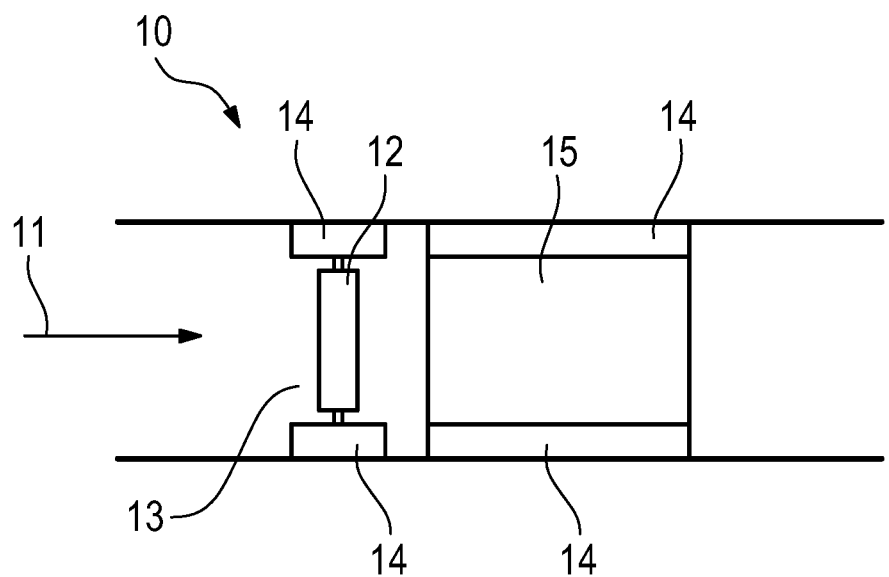
FIG. 2 shows a further schematic longitudinal section taken through the exhaust gas treatment device according to the disclosure.

FIGS. 1 and 2 schematically illustrate two exemplary embodiments of an exhaust gas treatment device 10 in a longitudinal section. The exhaust gas treatment device 10 is provided within an exhaust gas duct 13 and comprises a heating device 12, an exhaust gas purification device 15, and a housing 14.

In both embodiments, the heating device 12 is arranged spaced apart from and upstream of the exhaust gas purification device 15 in the exhaust gas flow direction 11.

Accordingly, the heating device 12 is a separate component that is independent with respect to the exhaust gas purification device 15 and serves only to heat the exhaust gas and has no purification function and is not integrated into the device 15.

In FIG. 1, the housing 14 is a shared housing 14 that is associated with the heating device 12 and the exhaust gas purification device 15.

In FIG. 2, the housing 14 is formed as a separate housing 14 that is associated with the heating device 12 and the exhaust gas purification device 15, respectively.

Figure 3:
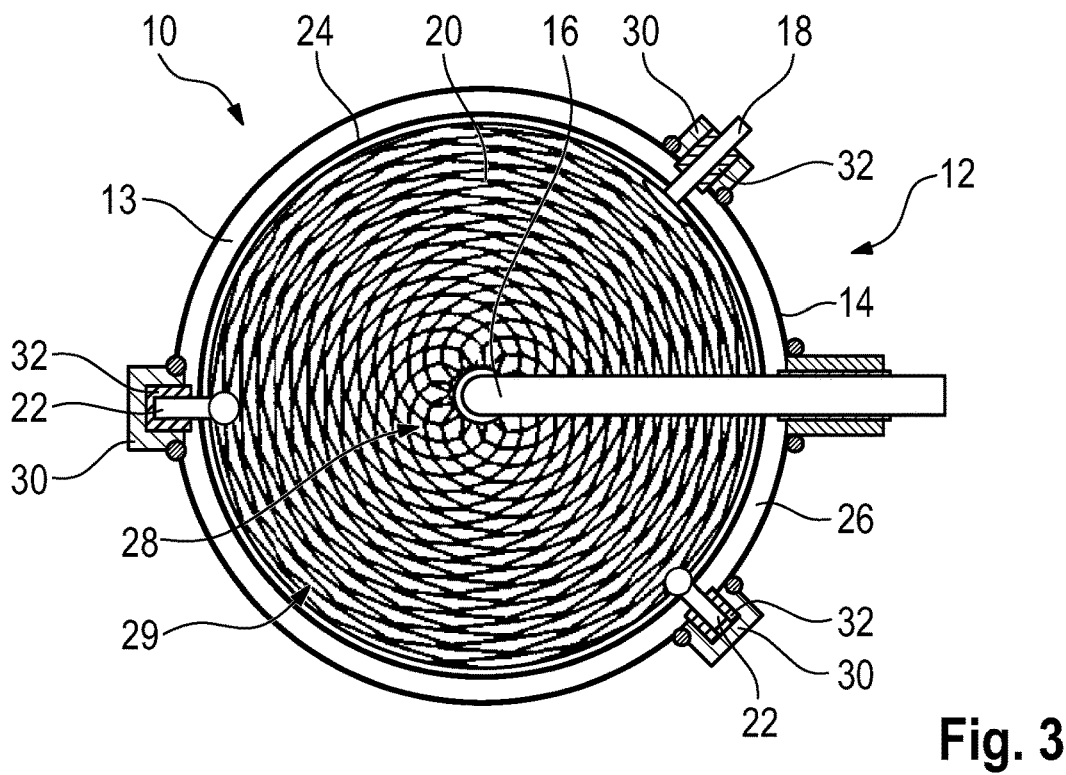
FIG. 3 shows a top view of a first embodiment of a heating device according to the disclosure of the exhaust gas treatment device according to the disclosure as shown in FIG. 1 or FIG. 2.

FIG. 3 shows a cross-section of the exhaust gas treatment device 10 as viewed in the exhaust gas flow direction 11. The exhaust gas treatment device 10 comprises the heating device 12 and the housing 14.

The heating device 12 is composed of a heating component 20 and a carrier structure, the carrier structure including a first electrode 16, a second electrode 18, two fasteners 22, and a support frame 24 surrounding the heating component 20 on the outside.

Optionally, the heating device 12 may also include a plurality of or fewer second electrodes 18 and/or fasteners 22.

The heating component 20 is made of an electrically conductive material and, in this embodiment, is formed as an inherently rigid heating grid.

The heating grid may be made of a metal sheet, for example.

The heating device 12 is arranged in the exhaust gas duct 13 via the carrier structure and is fastened to the housing 14 such that a gap 26 exists between the housing 14 and the heating device 12.

The gap 26 reduces or prevents interactions between the heating device 12 and the housing 14. In addition, the gap 26 can compensate for manufacturing inaccuracies.

The gap 26 may also be filled with a filler material, such as an insulation, for example.

The first electrode 16 extends through the housing 14 into a central region 28 of the heating device 12 and is electrically and mechanically connected to the heating component 20 in this region.

The first electrode 16 may be fastened to the housing 14 with an external weld for example.

The support frame 24 is provided at an edge region 29 of the heating component 20.

The radial extension of the edge region 29 toward the central region 28 is determined by the radial extent of the second electrode 18 and/or the carrier structure.

The second electrode 18 and the fasteners 22 are indirectly or directly connected to the support frame 24, thereby securing the heating device 12 in the housing 14.

Figure 5:
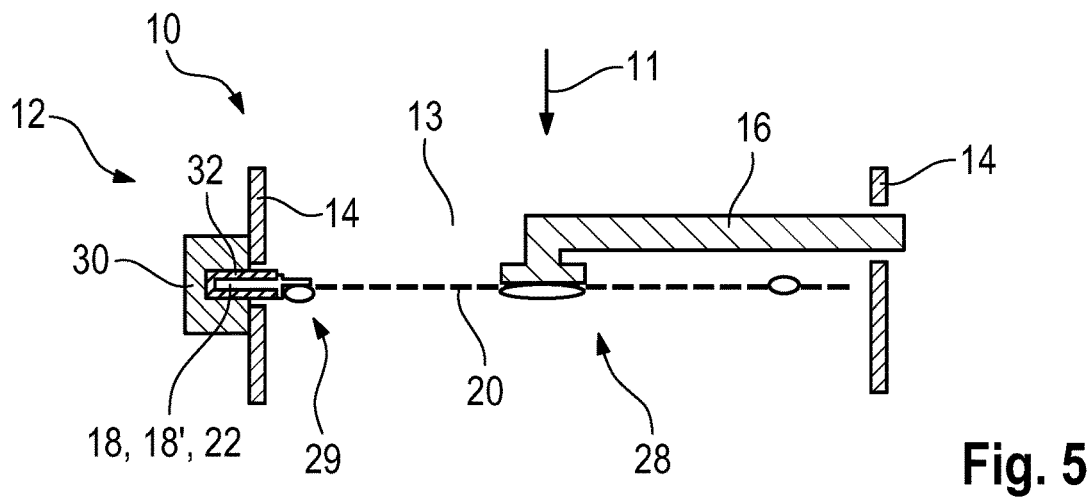
FIG. 5 shows a sectional view of the heating device according to the disclosure as shown in FIG. 3 or FIG. 4, with a first embodiment of a connection of a heating component to a housing.
Figure 6:
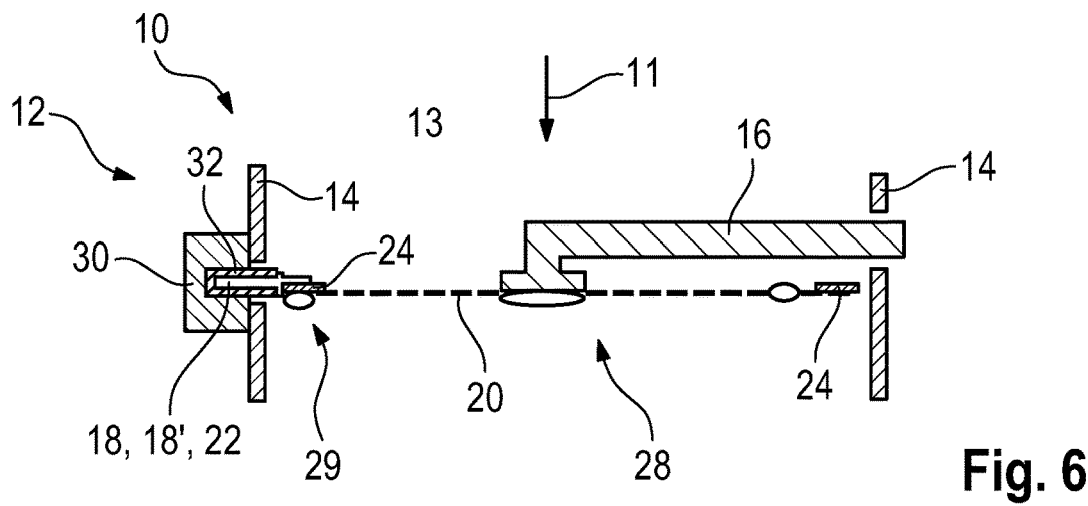
FIG. 6 shows a sectional view of the heating device according to the disclosure as shown in FIG. 3 or FIG. 4, with a second embodiment of the connection of the heating component to the housing.
Figure 7:
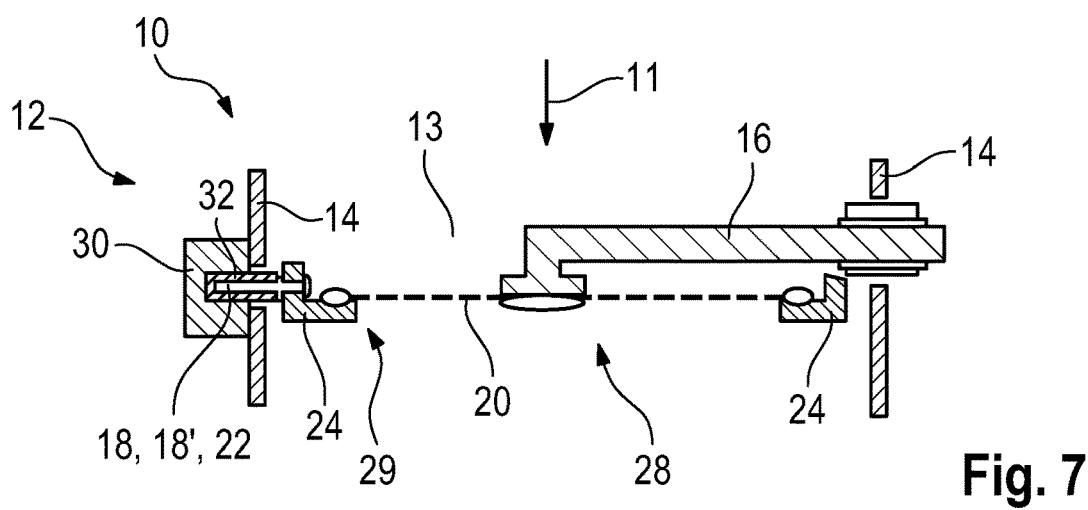
FIG. 7 shows a sectional view of the heating device according to the disclosure as shown in FIG. 3 or FIG. 4, with a third embodiment of the connection of the heating component to the housing.

The support frame 24 and its connection to the second electrode 18 and the fasteners 22 will be discussed in more detail further below (FIGS. 5-7).

The heating component 20 is electrically and mechanically connected to the second electrode 18.

The second electrode 18 and the fasteners 22 extend through the housing 14 and are received in a fastening sleeve 30 attached to the outside of the housing 14.

The fastening sleeves 30 may be fastened to the housing 14 by welding to the outside thereof, for example.

The housing 14 and the fastening sleeves 30 are electrically or galvanically isolated from the second electrode 18 and the fasteners 22 by a respective insulation 32. This prevents electrical interactions between the second electrode 18 or the fasteners 22 and the housing 14 or the fastening sleeve 30.

The insulation 32 of the second electrode 18 and the second electrode 18 extend through the housing 14 and the fastening sleeve 30. Cables or wires required for establishing an electrical circuit, for example, may be connected to the outside end of the second electrode 18.

During current conduction, current flows through the first electrode 16 into the central region 28 of the heating component 20 and further (substantially) in the radial direction and, in accordance with the profile of the heating component, also partly in the circumferential direction, to the edge region 29 to the second electrode 18.

As an alternative, the current may also flow in the reverse direction.

The heating component 20 will heat up when current flows, as a result of which the exhaust gas flowing through the heating device 12 is also heated.

The heated exhaust gas then flows into the exhaust gas purification device 15, heating it in the process. This allows the efficiency of the exhaust gas purification to be markedly increased.

Figure 4:
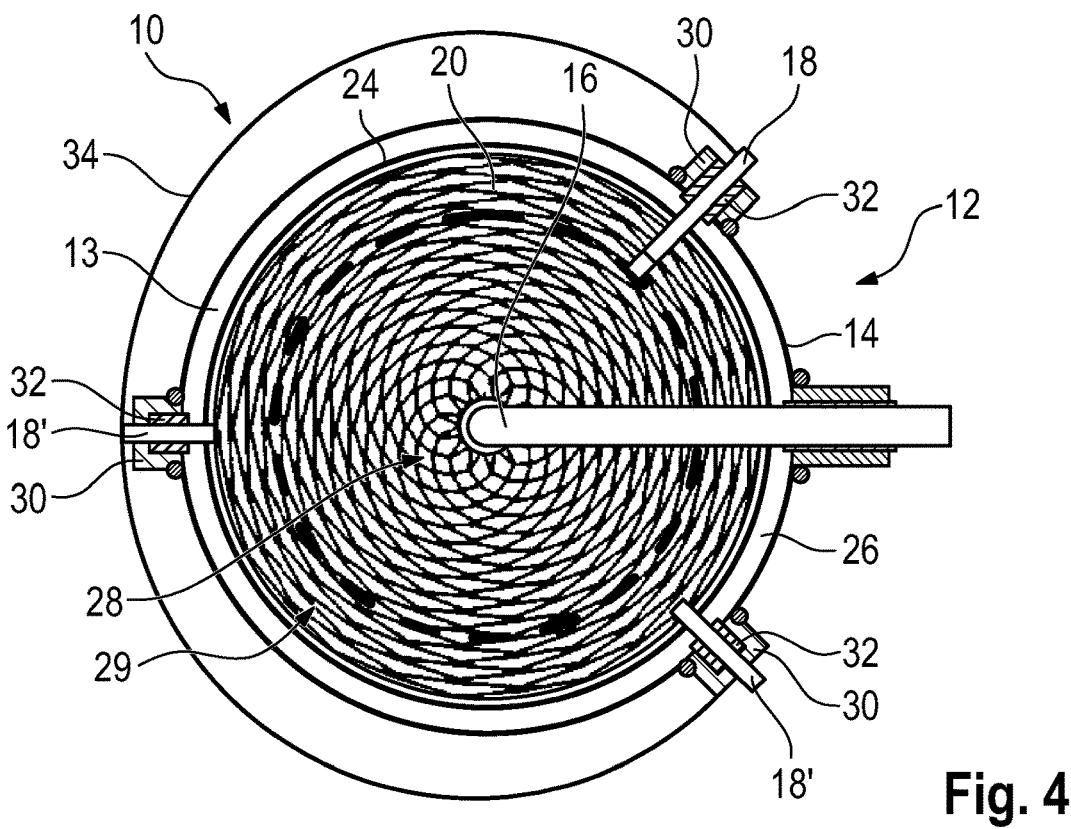
FIG. 4 shows a top view of a second embodiment of the heating device according to the disclosure of the exhaust gas treatment device according to the disclosure as shown in FIG. 1 or FIG. 2.

FIG. 4 shows a second embodiment of the heating device 12, which is similar to the first embodiment of FIG. 3 described above. Accordingly, similar or identical component parts are provided with the same reference numerals, and reference is made to the above explanations in this respect.

Instead of the fasteners 22 in the first embodiment of the heating device 12, two further second electrodes 18' are provided in the second embodiment. The structure and function of the additional second electrodes 18' and their attachment to the housing 14 are almost identical to those of the second electrode 18.

The second electrodes 18, 18' are connected to each other with a connecting cable 34.

In this embodiment, the second electrode 18 is longer and projects further towards the central region 28 of the heating device 12. Accordingly, the radial extent of the edge region 29 is larger and, consequently, that of the central region 28 is smaller than in the first embodiment according to FIG. 3.

Owing to the elongated second electrode 18 and the two further second electrodes 18', on the one hand the deformation load on the heating device 12 can be reduced and, on the other hand, the contacting area can be enlarged, which increases the reliability of contacting and improves the current flow in the heating component.

FIGS. 5, 6 and 7 show a longitudinal section of the exhaust gas treatment device 10. The focus here is on the various ways of connecting the second electrode 18 or the fasteners 22 to the support frame 24 or the heating component 20.

In FIG. 5, the heating component 20 is directly attached to the first electrode 16 and the second electrode(s) 18, 18' and/or the fasteners 22. This is possible because the second electrodes 18, 18' and the fasteners 22 are each insulated from the housing 14 and the fastening sleeve 30.

FIG. 6 shows a different embodiment, in which the support frame 24 is arranged between the second electrode(s) 18, 18' and/or the fasteners 22 and the heating component 20.

Such a connection is possible to the second electrodes 18, 18' only if the support frame 24 comprises an electrically conductive material.

In this embodiment, too, the support frame 24 may be circumferentially closed.

It would of course be conceivable to provide such a connection only at the fasteners 22 and to utilize with the electrodes 18, 18' a connection according to the embodiment of FIG. 5.

In this case, the support frame 24 cannot be circumferentially closed, but would have to feature a recess in the area of the second electrodes 18, 18'.

FIG. 7 illustrates an embodiment similar to that of FIG. 6.

Use of such a connection at the second electrodes 18, 18' can, for one thing, be ensured by an electrically conductive support frame 24 and, for another thing, be achieved in that the second electrodes 18, 18' extend through the support frame 24, in particular through that part of the support frame 24 which extends perpendicularly to the second electrodes 18, 18', and are connected directly to the heating component 20.

In this embodiment, the support frame 24 may be circumferentially closed.

Here, too, it would of course be conceivable to provide such a connection only at the fasteners 22 and to employ at the electrodes 18, 18' a connection according to the embodiment of FIG. 5.

Of course, other types of connection as well as combinations of the above-mentioned types of connection are also possible.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. An exhaust gas treatment device for a motor vehicle, comprising:
   a housing which defines an exhaust gas duct through which exhaust gas flows;
   a separate electric heating device which extends through the exhaust gas duct and through which exhaust gas flows and which is configured to heat the exhaust gas at a distance from a separate exhaust gas purification device and only serves to heat the exhaust gas and does not perform any purification function, and which comprises a heating component and a carrier structure, the heating component being attached to the carrier structure;
   first and second electrodes that are attached to the separate electric heating device and make electrical contact with the separate electric heating device, and wherein the first electrode extends as far as into a central region of the separate electric heating device and the second electrode extends as far as into an edge region of the separate electric heating device as viewed in an exhaust gas flow direction in the exhaust gas duct;
   the carrier structure having at least one circumferentially closed support frame surrounding the heating component on an outside;
   wherein the at least one circumferentially closed support frame is attached to the housing with at least one fastener; and
   wherein at least one of the first electrode, the second electrode, and the at least one fastener extends through the housing toward the separate electric heating device and each is received in a fastening sleeve attached to the housing.

2. The exhaust gas treatment device according to claim 1, wherein the edge region is a circumferentially closed frame region, a radial extension of which is defined by a radial extent of at least one of the second electrode and the carrier structure.

3. The exhaust gas treatment device according to claim 1, wherein current flow between the first and second electrodes takes place in a radial direction, from the central region to the edge region.

4. The exhaust gas treatment device according to claim 1, wherein, on a heating device side, the first and second electrodes are coupled only to the heating component and, on a housing side, the first and second electrodes are coupled to at least one of the housing and a fastening sleeve attached to an outside of the housing.

5. The exhaust gas treatment device according to claim 1, wherein the carrier structure is electrically conductive, thereby forming part of at least one of the first and second electrodes.

6. The exhaust gas treatment device according to claim 1, wherein the heating component is an inherently stiff heating grid, which is contacted by the first electrode in the central region and is coupled to the second electrode in the edge region.

7. The exhaust gas treatment device according to claim 1, wherein the heating component is an inherently stiff heating grid, which is contacted by the first electrode in the central region and is coupled to the second electrode in the edge region, and wherein the heating grid is mounted on an outside to the at least one circumferentially closed support frame.

8. The exhaust gas treatment device according to claim 1, wherein a gap is provided between the separate electric heating device and the housing.

9. The exhaust gas treatment device according to claim 1, wherein the separate exhaust gas purification device is provided downstream of, and spaced apart in the exhaust gas flow direction from, the separate electric heating device.

10. A vehicle comprising: an internal combustion engine, and the exhaust gas treatment device according to claim 1.

11. The exhaust gas treatment device according to claim 1, wherein the edge region circumferentially encloses the central region.

12. The exhaust gas treatment device according to claim 1, wherein current flow between the first and second electrodes takes place in a radial direction, from the edge region to the central region.

13. The exhaust gas treatment device according to claim 1, wherein the at least one circumferentially closed support frame surrounds the separate electric heating device on the outside in the edge region.

14. The exhaust gas treatment device according to claim 1, wherein the heating component is an inherently stiff heating grid, which is contacted by the first electrode in the central region and is coupled to the second electrode in the edge region, and wherein the heating grid is mounted in the edge region on an outside to the at least one circumferentially closed support frame.

15. The exhaust gas treatment device according to claim 8, wherein the gap is filled by an insulating material.

* * * * *